United States Patent
Wang et al.

(10) Patent No.: US 11,943,748 B2
(45) Date of Patent: *Mar. 26, 2024

(54) DYNAMIC DETERMINATION OF AVAILABLE SLOTS FOR TRANSMISSION OF SOUNDING REFERENCE SIGNAL (SRS) INFORMATION

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,694

(22) Filed: Dec. 30, 2022

(65) Prior Publication Data

US 2023/0147986 A1     May 11, 2023

Related U.S. Application Data

(63) Continuation of application No. 17/652,615, filed on Feb. 25, 2022, now Pat. No. 11,576,151, which is a
(Continued)

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04W 72/0446* (2013.01); *H04W 72/23* (2023.01)

(58) Field of Classification Search
CPC . H04W 72/02; H04W 72/23; H04W 72/0446; H04L 5/0051
See application file for complete search history.

(56) References Cited

U.S. PATENT DOCUMENTS

| 2018/0310257 A1 | 10/2018 | Papasakellariou |
| 2019/0254061 A1 | 8/2019 | Manolakos et al. |

(Continued)

FOREIGN PATENT DOCUMENTS

| CN | 110034889 A | 7/2019 |
| WO | 2019160756 | 8/2019 |
| WO | 2022051151 A1 | 3/2022 |

OTHER PUBLICATIONS

Interdigital Inc: "Discussion on SRS Enhancements", 3GPP TSG RAN WG1 #103-e, R1-2007631, e-Meeting, vol. RAN WG1, No. XP051945285, pp. 1-6, Oct. 26, 2020-Nov. 13, 2020, Oct. 23, 2020 (Oct. 23, 2020), Nov. 13, 2020 (Nov. 13, 2020), Retrieved from the Internet: URL: https://ftp.3gpp.org/tsg_ran/WG1_RL1/TSGR1_103-e/Docs/R1-2007631.zip R1-2007631_Discussion on SRS Enhancements.docx [Retrieved on Oct. 23, 2020] Sections 1-3, Part 2.3, Section 2.3, Figure 1.

(Continued)

*Primary Examiner* — Melvin C Marcelo
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, configuration information regarding one or more available slots associated with transmitting sounding reference signal (SRS) information. The UE may receive, from the base station, dynamic downlink communication including slot information for determining a select available slot from among the one or more available slots. The UE may transmit, to the base station, the SRS information during the select available slot, determined
(Continued)

based at least in part on the slot information and the configuration information. Numerous other aspects are described.

30 Claims, 8 Drawing Sheets

Related U.S. Application Data continuation of application No. PCT/CN2021/140372, filed on Dec. 22, 2021.

(51) Int. Cl.
*H04W 72/0446* (2023.01)
*H04W 72/23* (2023.01)

(56) References Cited

U.S. PATENT DOCUMENTS

| | | |
|---|---|---|
| 2020/0313816 A1 | 10/2020 | Sun et al. |
| 2020/0374157 A1 | 11/2020 | Chen et al. |
| 2020/0382253 A1 | 12/2020 | Manolakos et al. |
| 2022/0201657 A1 | 6/2022 | Wang et al. |

OTHER PUBLICATIONS

International Search Report and Written Opinion—PCT/CN2020/138232—ISA/EPO—dated Sep. 29, 2021.
International Search Report and Written Opinion—PCT/CN2021/140372—ISA/EPO—dated Mar. 23, 2022.
NEC: "Discussion on SRS Enhancement", 3GPP TSG RAN WG1 #103-e, R1-2008948, Nov. 13, 2020 (Nov. 13, 2020), 4 Pages, The Whole Document.

DYNAMIC DETERMINATION OF AVAILABLE SLOTS FOR TRANSMISSION OF SOUNDING REFERENCE SIGNAL (SRS) INFORMATION

CROSS-REFERENCE TO RELATED APPLICATIONS

This application is a continuation of U.S. patent application Ser. No. 17/652,615, filed Feb. 25, 2022, which is a continuation of International Application No. PCT/CN2021/140372, filed Dec. 22, 2021, entitled "DYNAMIC DETERMINATION OF AVAILABLE SLOTS FOR TRANSMISSION OF SOUNDING REFERENCE SIGNAL (SRS) INFORMATION", which claims priority to PCT Application No. PCT/CN2020/138232, filed on Dec. 22, 2020, entitled "DYNAMIC DETERMINATION OF AVAILABLE SLOTS FOR TRANSMISSION OF SOUNDING REFERENCE SIGNAL (SRS) INFORMATION," and assigned to the assignee hereof. The disclosure of the prior Applications is considered part of and is incorporated by reference into this Patent Application in its entirety.

FIELD OF THE DISCLOSURE

Aspects of the present disclosure generally relate to wireless communication and to techniques and apparatuses for dynamic determination of available slots for transmission of sounding reference signal (SRS) information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, configuration information regarding one or more available slots associated with transmitting sounding reference signal (SRS) information; receiving, from the base station, dynamic downlink communication including slot information for determining a select available slot from among the one or more available slots; and transmitting, to the base station, the SRS information during the select available slot, determined based at least in part on the slot information and the configuration information.

In some aspects, a UE for wireless communication includes a memory and one or more processors coupled to the memory, the memory and the one or more processors configured to: receive, from a base station, configuration information regarding one or more available slots associated with transmitting SRS information; receive, from the base station, dynamic downlink communication including slot information for determining a select available slot from among the one or more available slots; and transmit, to the base station, the SRS information during the select available slot, determined based at least in part on the slot information and the configuration information.

In some aspects, a non-transitory computer-readable medium storing a set of instructions for wireless communication includes one or more instructions that, when executed by one or more processors of a UE, cause the UE to: receive, from a base station, configuration information regarding one or more available slots associated with transmitting SRS information; receive, from the base station, dynamic downlink communication including slot information for determining a select available slot from among the one or more available slots; and transmit, to the base station, the SRS information during the select available slot, determined based at least in part on the slot information and the configuration information.

In some aspects, an apparatus for wireless communication includes means for receiving, from a base station, configuration information regarding one or more available slots associated with transmitting SRS information; means for receiving, from the base station, dynamic downlink communication including slot information for determining a select available slot from among the one or more available slots; and means for transmitting, to the base station, the SRS information during the select available slot, determined based at least in part on the slot information and the configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
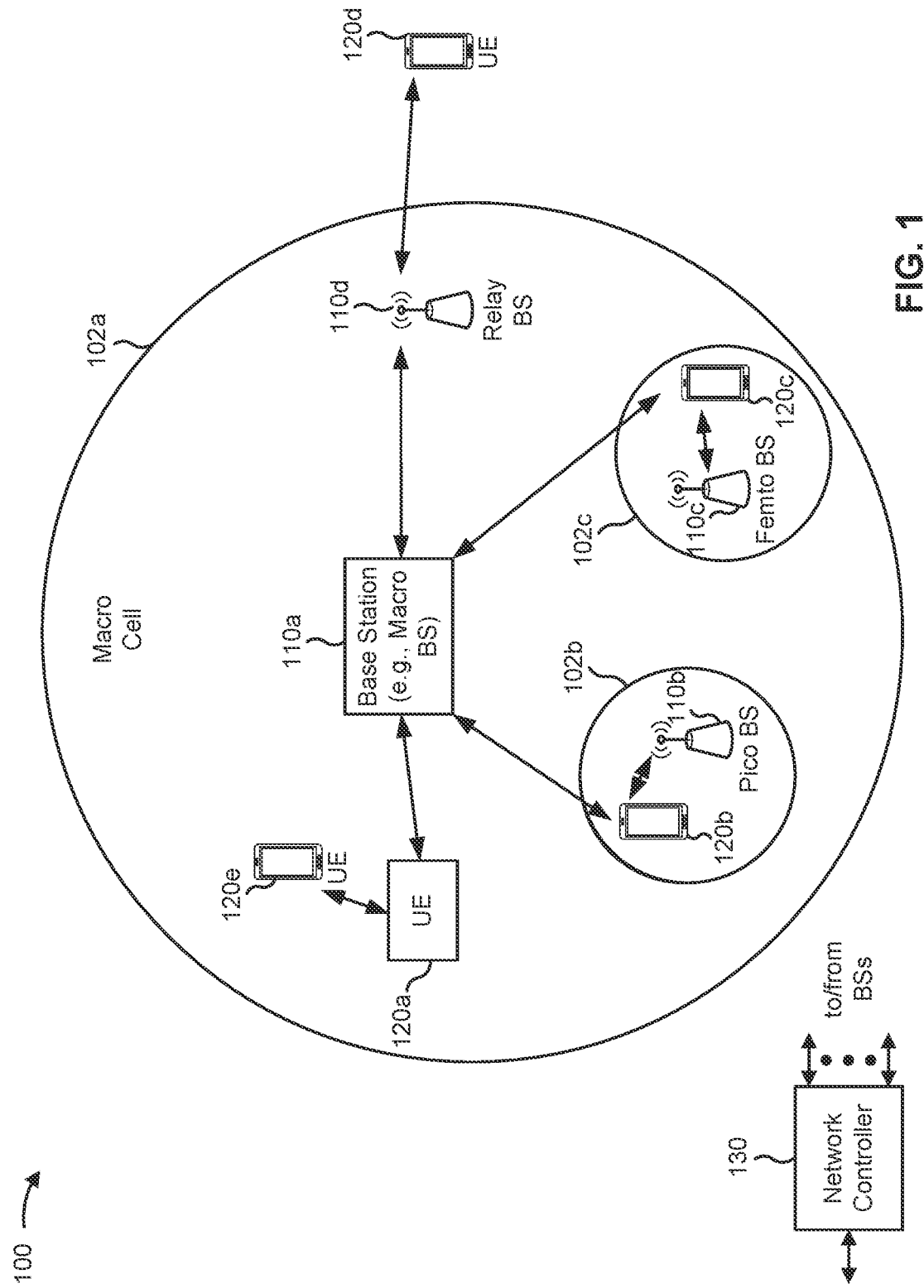
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
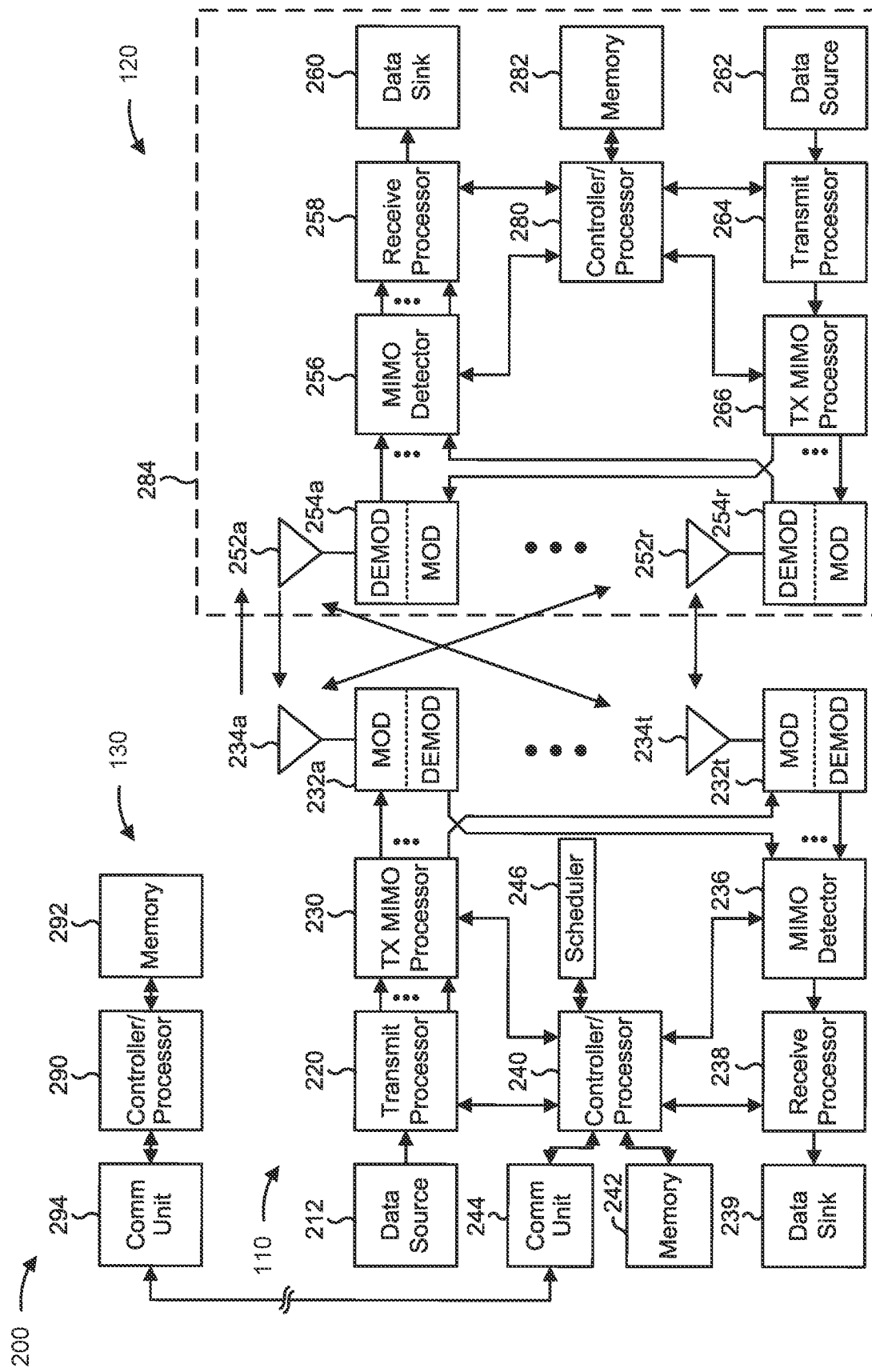
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with dynamic determination of available slots for transmission of sounding reference signal (SRS) information, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE (e.g., UE 120) includes means for receiving, from a base station, configuration information regarding one or more available slots associated with transmitting SRS information; means for receiving, from the base station, dynamic downlink communication including slot information for determining a select available slot from among the one or more available slots; and/or means for transmitting, to the base station, the SRS information during the select available slot, determined based at least in part on the slot information and the configuration information. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining the select available slot based at least in part on a slot factor, associated with a format related to a given slot, and an initial available slot value, the slot factor being received via the dynamic downlink communication and the initial available slot value being received via the configuration information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct data communication with a BS in a wireless network such as an LTE network or a 5G/NR network. The data communication may include downlink communications from the BS to the UE and uplink communications from the UE to the BS. The UE may receive the downlink communications during a slot reserved for downlink communications (e.g., a downlink slot) and may transmit the uplink communications during a slot reserved for uplink communications (e.g., an uplink slot).

To adequately receive the uplink communications from the UE, the BS may estimate a measure of quality associated with the uplink communications. To enable the BS to estimate the measure of quality, the UE may transmit SRS information to the BS. Based on receiving the SRS information, the BS may estimate the measure of quality associated with the uplink communications. The SRS information may include SRS resources configured by the BS to enable the UE to perform, for example, antenna switching operations, codebook-based operations, non-codebook-based operations, beam management operations, or the like.

Figure 3:
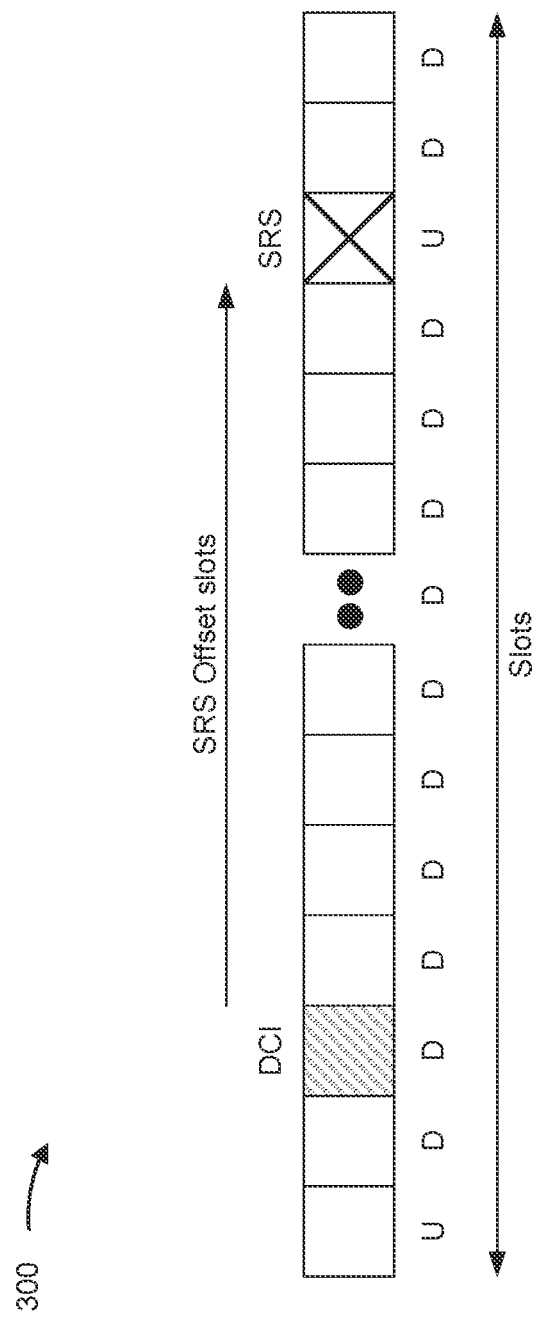
FIG. 3 is a diagram illustrating an example associated with dynamic determination of available slots for transmission of SRS information, in accordance with the present disclosure.
Figure 4:
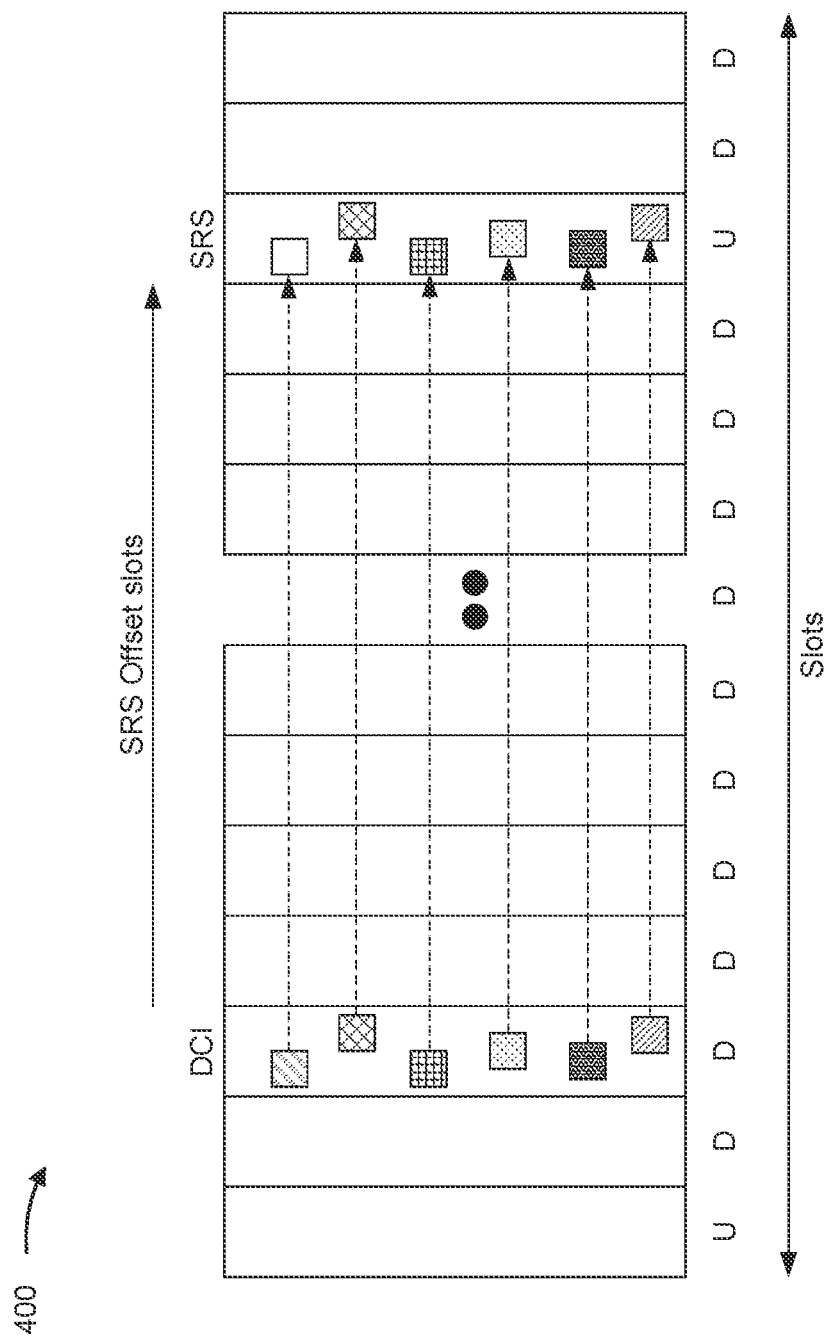
FIG. 4 is a diagram illustrating an example associated with dynamic determination of available slots for transmission of SRS information, in accordance with the present disclosure.

During the data communication, as shown in example 300 of FIG. 3, the UE may receive downlink control information (DCI) to trigger the UE to transmit the SRS information. The UE may receive the DCI during a given downlink slot (D) and may transmit the SRS information during a given uplink slot (U) that occurs a fixed number of SRS offset slots after the given downlink slot. The given uplink slot may be referred to as a transmission slot. The fixed number of SRS offset slots may be preconfigured by the BS during initiation of the data communication between the BS and the UE.

In some cases, after transmitting the DCI and before receiving the SRS information, the BS may reserve the transmission slot for downlink communications. In other words, the BS may convert the transmission slot from being an uplink slot U to being a downlink slot D. In this case, the UE may not be able to transmit the SRS information during the transmission slot. Also, due to the fixed number of SRS offset slots, the UE may not be able to transmit the SRS information during another uplink slot. As a result, the BS may not adequately receive the SRS information from the UE.

In some cases, the BS may be communicating with a plurality of UEs. To receive respective SRS information from the plurality of UEs during a transmission slot, as shown in example 400 of FIG. 4, the BS may transmit a plurality of DCIs during a given downlink slot, which may occur the fixed number of SRS offset slots before the transmission slot. Transmitting the plurality of DCIs during the given downlink slot may cause DCI congestion. Additionally, transmission of the respective SRS information by the plurality of UEs during the transmission slot may result in interference among the SRS information. As a result, the BS may not adequately receive the respective SRS information from the plurality of UEs.

Without adequately receiving the SRS information, the BS may not be able to adequately estimate the measure of quality associated with the uplink communications. As a result, the BS may not be able to adequately receive uplink communications, and the data communication between the UE (or the plurality of UEs) and the BS may experience an interruption or a stoppage. Resolving the interruption or stoppage may inefficiently consume UE resources (e.g., amount of processing, utilization of memory, power consumption, or the like) and network resources (e.g., bandwidth, management resources, or the like) that could be more efficiently utilized to perform other tasks related to the data communication.

Various aspects of techniques and apparatuses described herein may enable dynamic determination of available slots for transmission of SRS information. In some aspects, during initiation of a data communication between a BS and a UE, the UE may receive configuration information associated with one or more available slots associated with transmitting the SRS information. During the data communication, the UE may receive dynamic signaling (e.g., medium access control (MAC) signaling including a control element (MAC CE), DCI signaling, or a combination thereof) including slot information to enable the UE to determine a select available slot, from among the one or more available slots, during which the SRS information is to be transmitted. The slot information included in the dynamic signaling may accommodate the BS having converted a transmission slot (an uplink slot) to a downlink slot. The UE may utilize the select available slot to transmit the SRS information. Additionally, the BS may transmit respective DCI to a respective plurality of UEs during different slots to trigger transmission of respective SRS information during respective select available slots, thereby avoiding DCI congestion and/or interference among the SRS information. In this way, the BS may adequately receive the SRS information and may adequately estimate a measure of quality associated with uplink communications. As a result, the BS may adequately receive the uplink communications from the UE, and the data communication between the UE and the BS may continue uninterrupted. Additionally, transmitting the SRS information during the select available slot may enable efficient utilization of UE resources (e.g., amount of processing, utilization of memory, or the like) and network resources (e.g., bandwidth, subchannels, or the like).

In some aspects, a UE may receive, from a base station, configuration information regarding one or more available slots associated with transmitting SRS information; receive, from the base station, dynamic downlink communication including slot information for determining a select available slot from among the one or more available slots; and transmit, to the base station, the SRS information during the select available slot, determined based at least in part on the slot information and the configuration information. In this way, data communication between the UE and the BS may be improved.

Figure 5:
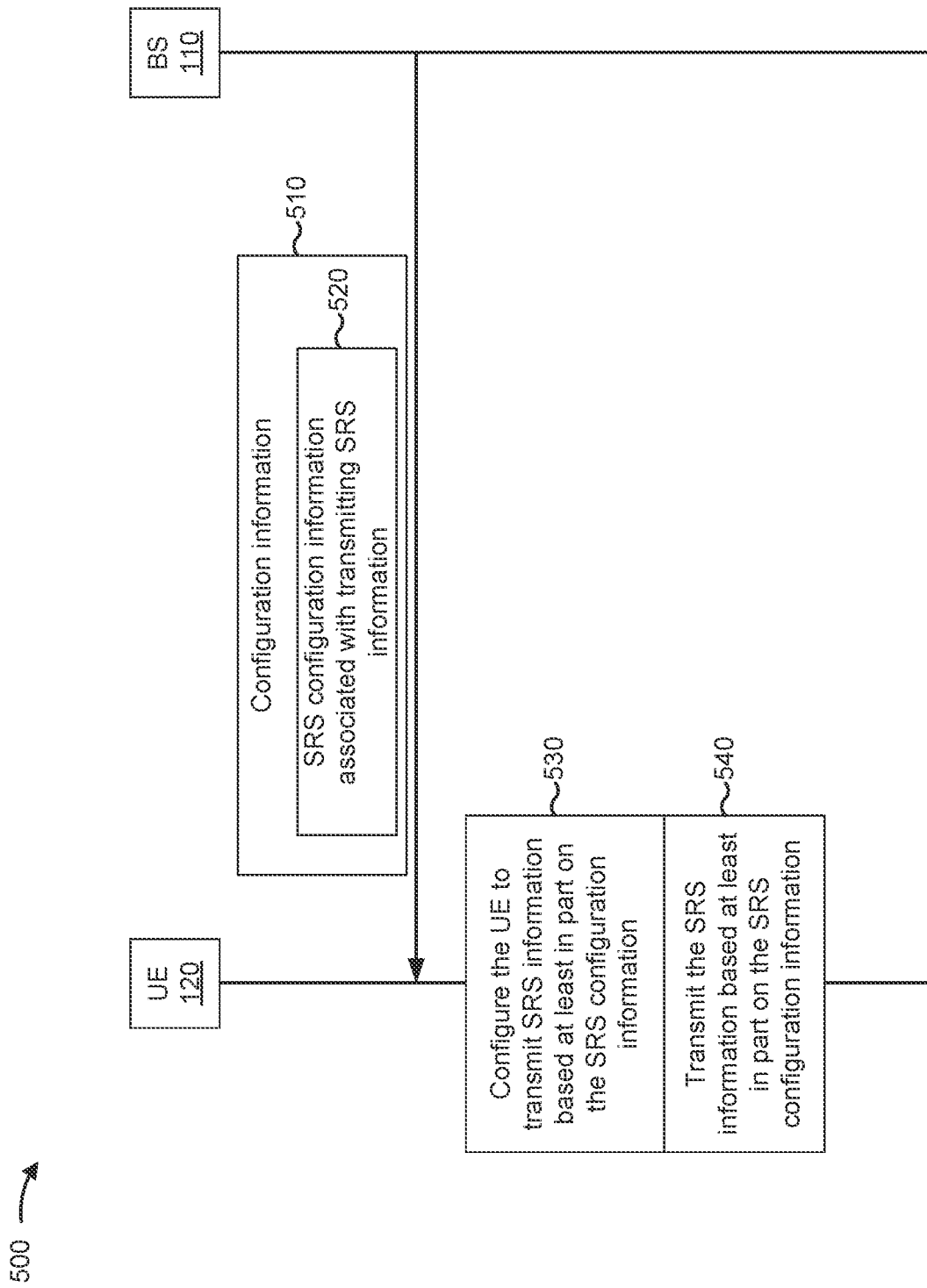
FIG. 5 is a diagram illustrating an example associated with dynamic determination of available slots for transmission of SRS information, in accordance with the present disclosure.

FIG. 5 is a diagram illustrating an example 500 associated with dynamic determination of available slots for transmission of SRS information, in accordance with the present disclosure. FIG. 5 shows a UE 120 and a BS 110 conducting data communication in, for example, an LTE network or a 5G/NR network. The data communication may include downlink communications from the BS 110 to the UE 120 and may include uplink communications from the UE 120 to the BS 110.

As shown by reference number 510, the BS 110 may transmit, and the UE 120 may receive, configuration information at a beginning (e.g., during initiation) of the data communication. In some aspects, the UE 120 may receive the configuration information from a device other than BS 110 (e.g., from another base station). In some aspects, the UE 120 may receive the configuration information via, for example, a control channel (e.g., a physical downlink control channel (PDCCH)) between the UE 120 and the BS 110. The configuration information may be communicated via radio resource control (RRC) signaling, MAC signaling (e.g., MAC CE), DCI signaling, or a combination thereof (e.g., RRC configuration of a set of values for a parameter and DCI indication of a selected value of the parameter).

In some aspects, the configuration information may include information associated with configuring the UE 120 with one or more SRS resource sets, each SRS resource set comprising a respective one or more SRS resources (e.g., the configured SRS resources). The configured SRS resources may be utilized by the UE 120 to perform, for example, SRS signaling antenna switching operations, codebook-based operations, non-codebook-based operations, beam management operations, or the like.

As shown by reference number 520, the configuration information may include SRS configuration information associated with transmitting SRS information. As shown by reference number 530, based at least in part on the SRS configuration information, the UE 120 may configure the UE 120 to transmit the SRS information.

In some aspects, the configuration information may include an indication of, for example, one or more configuration parameters for the UE 120 to use to configure the UE 120 for the data communication. In some aspects, the SRS configuration information may include/indicate information associated with transmitting SRS information. In some aspects, the SRS configuration information may indicate a fixed number of SRS offset slots. The fixed number may be an integer value from, for example, 1 through 32. If no value for the fixed number of SRS offset slots is indicated, then the UE 120 may determine the value for the fixed number of SRS offset slots to be 0. Further, the SRS configuration information may indicate that the UE 120 is to transmit the SRS information during an uplink slot that occurs the fixed number of SRS offset slots after a reference slot.

The SRS configuration information may also include information regarding one or more available slots associated with transmitting the SRS information. In some aspects, the information regarding the one or more available slots may include a list of integer values representing respective select numbers of offset slots to be used by the UE 120 to determine a select available slot from among the one or more available slots. For instance, the SRS configuration information may indicate that the UE 120 is to transmit the SRS information during the select available slot, which occurs a select number (e.g., t) of offset slots after the reference slot. Based at least in part on the SRS configuration information, the UE 120 may transmit the SRS information t offset slots after the reference slot. In some aspects, the UE may transmit the SRS information t+1 offset slots after the reference slot.

Figure 6:
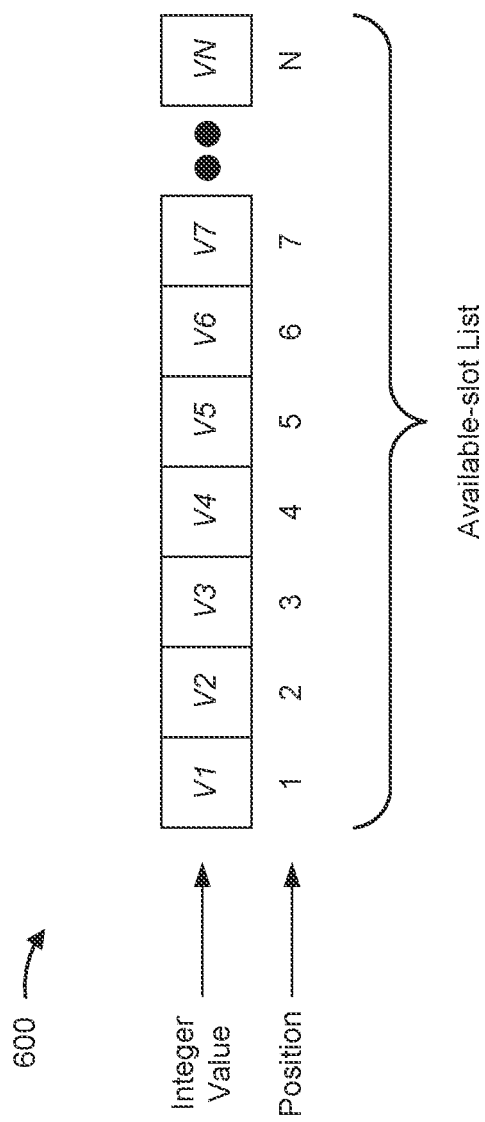
FIG. 6 is a diagram illustrating an example associated with dynamic determination of available slots for transmission of SRS information, in accordance with the present disclosure.

In some aspects, as shown in example 600 of FIG. 6, the list of integer values (which may be referred to as "t-values") representing the respective select numbers of offset slots may be included in one or more available-slot lists. In some aspects, for example, an available-slot list may include a plurality of t-values representing respective numbers t of offset slots to be utilized by the UE 120 to determine the select available slot. In some aspects, alternatively to transmitting the SRS information during the select available slot that occurs the fixed number of SRS offset slots after the reference slot, the SRS configuration information may indicate that the UE 120 is to transmit the SRS information during the select available slot, which occurs the select number of offset slots after the reference slot. In some aspects, a t-value may represent a number of slots between the reference slot and the select available slot. For example, a first (e.g., select) t-value of a set of t-values indicated by an available-slot list may indicate a number of slots between the reference slot and the select available slot such as in cases in which the number of slots between the reference slot and the select available slot is n−1 (where t=n). In other aspects, a t-value may represent a number of slots between the reference slot and the select available slot by corresponding to a number of offset slots to be utilized by the UE 120 in determining the select available slot.

For instance, as shown in example 600 of FIG. 6, an available-slot list may include N integer values (e.g., V1, V2, V3, V4, V5, V6, V7, . . . , VN) representing respective select numbers of offset slots to be utilized by the UE 120 to determine the select available slot. Each integer value is associated with a respective position in the available-slot list. For instance, V1 is associated with position 1, V2 is associated with position 2, . . . , and VN is associated with position N. In some aspects, N may have an integer value from 1 through 128.

In some aspects, the SRS configuration information may enable the UE 120 to configure the UE 120 to determine the select available slot and to transmit the SRS information during the select available slot. For instance, the SRS configuration information may indicate that the UE 120 is to determine the select available slot based at least in part on slot information and/or on the SRS configuration information. The slot information may be included in dynamic signaling (e.g., dynamic downlink communication), which may be received from the BS 110 during the data communication. The dynamic signaling may include the MAC CE, the DCI, or a combination thereof.

In some aspects, the SRS configuration information and/or the slot information may indicate that the reference slot is a slot during which the DCI, that triggers transmission of the SRS information, is received. In some aspects, the SRS configuration information and/or the slot information may indicate that the reference slot is a given slot (e.g., a slot indicated by the legacy triggering offset) configured by the BS 110.

In some aspects, the slot information may indicate the respective position of an integer value in the available-slot list. Based at least in part on the indicated respective position, the UE 120 may determine the select number of offset slots. For instance, when the slot information indicates position 3, the UE 120 may determine that the SRS information is to be transmitted during the select available slot, which occurs V3 slots after the reference slot. Similarly, when the slot information indicates position N, the UE 120 may determine that the SRS information is to be transmitted during the select available slot, which occurs VN slots after the reference slot.

In some aspects, the slot information may be received via the dynamic signaling (e.g., MAC CE and/or DCI) transmitted from the BS 110 to the UE 120. When the slot information is received via DCI, one or more bits included in the DCI may indicate the respective position in the available-slot list. In some aspects, a quantity (e.g., x) of the one or more bits may be based at least in part on the integer value of N. In some aspects, x number of bits may be used when the available-slot list includes 2x positions (e.g., N=2x). For instance, when the value of N=2 (e.g., there are two integer values, V1 and V2, in the available-slot list), the quantity of x may be 1; when the value of N=4 (e.g., there are four integer values, V1 through V4, in the available-slot list), the quantity of x may be 2; when the value of N=8 (e.g., there are eight integer values, V1 through V8, in the available-slot list), the quantity of x may be 3, and so on.

In some aspects, the UE 120 may determine the quantity of the one or more bits that are used by the DCI to indicate the respective position in the available-slot list. The quantity of the one or more bits may be based at least in part on a maximum number of available slots associated with a set of available slots of a plurality of sets of available slots. In some aspects, the plurality of sets of available slots may be associated with at least one component carrier. For example, in some aspects, a plurality of SRS resource sets may be configured across a number of component carriers, and each SRS resource set may have a corresponding available-slot list that includes a corresponding set of t-values. Thus, the plurality of SRS resource sets may correspond to a plurality of sets of t-values. The UE 120 may determine the quantity of bits used by the DCI to indicate respective positions in the available-slot lists based at least in part on a scheduled component carrier configuration of t-values (offset slot values, as indicated above). For example, the UE 120 may determine the quantity of bits based at least in part on a set of t-values, of the plurality of sets of t-values, that has a maximum number of t-values as compared to the other sets of t-values. In some aspects, the UE 120 may determine the quantity of bits based at least in part on the maximum number of t-values across all configured component carriers. In some aspects, the UE 120 may determine the quantity of bits per component carrier based at least in part on a set of t-values having the maximum number of t-values of the sets of t-values associated with a specified component carrier.

In some aspects, the SRS configuration information may indicate a plurality of available-slot lists. In this case, slot information may be received via the MAC CE, which may indicate a select available-slot list, from among the plurality of available-slot lists, to be utilized by the UE 120 to determine the select available slot. Further, one or more bits in the MAC CE may indicate the respective position in the select available-slot list. Based at least in part on the indicated respective position, the UE 120 may determine the select number of offset slots, as discussed above. Alternatively, after the select available-slot list is indicated by the MAC CE, the UE 120 may receive DCI including the x number of bits that indicate the respective position in the select available-slot list. Based at least in part on the indicated respective position by the MAC CE and/or DCI, the UE 120 may determine the select number of offset slots, as discussed above. Utilizing the MAC CE to indicate at least the select available-slot list, from among the plurality of available-slot lists, may enable the BS 110 to utilize a reduced number of bits in the DCI for indicating the slot information associated with transmitting the SRS information.

In some aspects, the SRS configuration information may enable the UE 120 to configure the UE 120 to transmit the SRS information based at least in part on a time of receipt of the dynamic signaling (e.g., MAC CE and/or DCI). For instance, the UE 120 may transmit the SRS information, based at least in part on the slot information included in a MAC CE, after a MAC CE duration of time. Similarly, the UE 120 may transmit the SRS information, based at least in part on the slot information included in DCI, after a DCI duration of time. In some aspects, the MAC CE/DCI duration of time may be, for example, 3 milliseconds after receiving the MAC CE/DCI. In a situation where the UE 120 receives the DCI, indicating the respective position in the select available-slot list, prior to an expiration of the MAC CE duration of time, the UE 120 may utilize a default available-slot list, from among the plurality of available-slot lists, as the select available-slot list. In some aspects, in a situation where the UE 120 receives the DCI, indicating the respective position in the select available-slot list, prior to the expiration of the MAC CE duration of time, the UE 120 may utilize a previously utilized available-slot list, from among the plurality of available-slot lists, as the select available-slot list.

In some aspects, the SRS configuration information may indicate an available-slot list including a plurality of integer values representing the respective select numbers of offset slots associated with the one or more available slots. In this case, the MAC CE and/or DCI received via downlink signaling may indicate a select subset of a plurality of integer values, from among the plurality of integer values, to be utilized by the UE 120 to determine the select available slot. Further, one or more bits in the MAC CE and/or DCI may indicate the respective position in the select subset of the plurality of integer values. Based at least in part on the indicated respective position, the UE 120 may determine the select number of offset slots, as discussed above. Utilizing the MAC CE to indicate at least the select subset of integer values, from among the plurality of integer values, may enable the BS 110 to avoid using the DCI for indicating the slot information associated with transmitting the SRS information, thereby avoiding DCI congestion (or PDCCH congestion).

In some aspects, the SRS configuration information may enable the UE 120 to configure the UE 120 to transmit the SRS information based at least in part on a time of receipt of the dynamic signal (e.g., MAC CE and/or DCI). For instance, the UE 120 may transmit the SRS information, based at least in part on the slot information included in the MAC CE, after the MAC CE duration of time. Similarly, the UE 120 may transmit the SRS information, based at least in part on the slot information included in DCI, after a DCI duration of time. In some aspects, the MAC CE and/or DCI duration of time may be, for example, 3 milliseconds after receiving the MAC CE and/or DCI. In a situation where the UE 120 receives the DCI, triggering transmission of the SRS information, prior to the expiration of the MAC CE duration of time, the UE 120 may utilize a default subset of integer values, from among the plurality of integer values, as the select subset of integer values. In some aspects, in a situation where the UE 120 receives the DCI, triggering transmission of the SRS information, prior to the expiration of the MAC CE duration of time, the UE 120 may utilize a previously utilized subset of integer values, from among the plurality of integer values, as the select subset of integer values.

In some aspects, the SRS configuration information and/or the slot information may enable the UE 120 to calculate (e.g., determine) the select number of offset slots. In some aspects, the SRS configuration information and/or the slot information may include a slot factor value and/or an initial available slot value, and may enable the UE 120 to calculate the select number (e.g., t) of offset slots based at least in part on the initial available slot value (e.g., V1, V2, . . . , VN) and the slot factor value. In some aspects, the relationship may be expressed as t=(initial available slot value*slot factor value). The UE 120 may transmit the SRS information during the select available slot that occurs t offset slots after the reference slot. In some aspects, the UE may transmit the SRS information during the select available slot that occurs t+1 offset slots after the reference slot. In some aspects, the slot factor value may be associated with a format related to a given slot. For instance, the slot factor may indicate whether the given slot is an uplink slot (e.g., U) reserved for uplink communications from the UE 120 to the BS 110, or is a downlink slot (e.g., D) reserved for downlink communications from the BS 110 to the UE 120.

When the slot information indicates position 2 and a slot factor value of 2, the UE 120 may calculate the select number (e.g., t) of offset slots as V2*2. In a situation where the value of V2 is equal to 4, the UE 120 may calculate the select number of offset slots as 4*2=8. The UE 120 may transmit the SRS information during the select available slot that occurs 8 offset slots after the reference slot. In some aspects, the UE may transmit the SRS information during the select available slot that occurs 9 (e.g., t+1) offset slots after the reference slot.

As shown by reference number 540, the UE 120 may transmit the SRS information based at least in part on receiving the configuration information, the SRS configuration information, and/or the slot information, as discussed above. In some aspects, the UE 120 may utilize included transmission circuitry to transmit the SRS information and may utilize included reception circuitry to receive the configuration information, the SRS configuration information, and/or the slot information. The transmission circuitry may include, for example, one or more components (e.g., transmit processor 264, TX MIMO processor 266, modulator 254, and/or antennas 252) and the reception circuitry may include, for example, one or more components (e.g., receive processor 258, MIMO detector 256, demodulator 254, and/or antennas 252), as discussed above with respect to FIG. 2. In some aspects, the UE 120 may include the UE 120 discussed with respect to FIG. 2.

By utilizing the dynamic determination of available slots for transmission of SRS information, as discussed herein, a UE may utilize the select (e.g., optimal) available slot to transmit the SRS information. In this way, the UE may enable the BS to adequately receive the SRS information and to adequately estimate a measure of quality associated with uplink communications. As a result, the BS may adequately receive the uplink communications from the UE and the data communication between the UE and the BS may continue uninterrupted. Additionally, transmitting the SRS information during the select available slot may enable efficient utilization of UE resources (e.g., amount of processing, utilization of memory, or the like) and network resources (e.g., bandwidth, subchannels, or the like) and data communication between the UE and the BS may be improved.

As indicated above, FIGS. 5 and 6 are provided as examples. Other examples may differ from what is described with regard to FIGS. 5 and 6.

Figure 7:
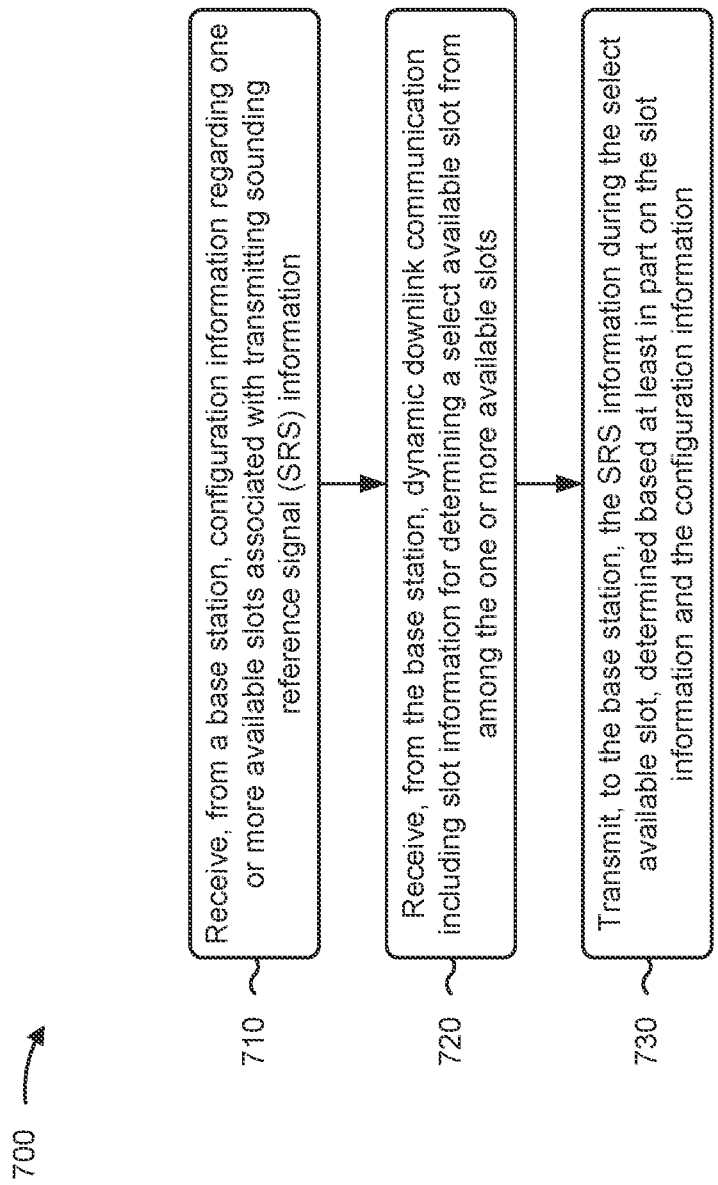
FIG. 7 is a diagram illustrating an example process associated with dynamic determination of available slots for transmission of SRS information, in accordance with the present disclosure.

FIG. 7 is a diagram illustrating an example process 700 performed, for example, by a UE (e.g., UE 120), in accordance with the present disclosure. Example process 700 is an example where the UE performs operations associated with dynamic determination of available slots for transmission of SRS information.

As shown in FIG. 7, in some aspects, process 700 may include receiving, from a base station, configuration information regarding one or more available slots associated with transmitting SRS information (block 710). For example, the UE (e.g., using reception component 802, depicted in FIG. 8) may receive, from a base station, configuration information regarding one or more available slots associated with transmitting SRS information, as described above.

As further shown in FIG. 7, in some aspects, process 700 may include receiving, from the base station, dynamic downlink communication including slot information for determining a select available slot from among the one or more available slots (block 720). For example, the UE (e.g., using reception component 802, depicted in FIG. 8) may receive, from the base station, dynamic downlink communication including slot information for determining a select available slot from among the one or more available slots, as described above.

As further shown in FIG. 7, in some aspects, process 700 may include transmitting, to the base station, the SRS information during the select available slot, determined based at least in part on the slot information and the configuration information (block 730). For example, the UE (e.g., using transmission component 804, depicted in FIG. 8) may transmit, to the base station, the SRS information during the select available slot, determined based at least in part on the slot information and the configuration information, as described above.

Process 700 may include additional aspects, such as any single aspect or any combination of aspects described below and/or in connection with one or more other processes described elsewhere herein.

In a first aspect, the one or more available slots are included in an available-slot list.

In a second aspect, alone or in combination with the first aspect, process 700 includes determining the select available slot based at least in part on a slot factor, associated with a format related to a given slot, and an initial available slot value, the slot factor being received via the dynamic downlink communication and the initial available slot value being received via the configuration information.

In a third aspect, alone or in combination with one or more of the first and second aspects, the slot information includes a slot factor indicating whether a given slot is an uplink slot reserved for uplink communications from the UE to the base station or is a downlink slot reserved for downlink communications from the base station to the UE.

In a fourth aspect, alone or in combination with one or more of the first through third aspects, the dynamic downlink communication includes DCI received during a reference slot, the DCI including the slot information.

In a fifth aspect, alone or in combination with one or more of the first through fourth aspects, the select available slot occurs a given quantity of slots after a reference slot, indicated by the configuration information.

In a sixth aspect, alone or in combination with one or more of the first through fifth aspects, process 700 includes the dynamic downlink communication includes DCI, and one or more bits included in the DCI indicate the slot information.

In a seventh aspect, alone or in combination with one or more of the first through sixth aspects, process 700 includes the dynamic downlink communication includes DCI, and one or more bits included in the DCI indicate the slot information, a quantity of the one or more bits being based at least in part on a quantity of the one or more available slots.

In an eighth aspect, alone or in combination with one or more of the first through seventh aspects, the quantity of the one or more bits is based at least in part on a maximum number of available slots associated with a set of available slots of a plurality of sets of available slots.

In a ninth aspect, alone or in combination with one or more of the first through eighth aspects, the plurality of sets of available slots are associated with at least one component carrier.

In a tenth aspect, alone or in combination with one or more of the first through ninth aspects, process 700 includes the one or more available slots are included in a plurality of available-slot lists, and the dynamic downlink communication includes a MAC CE and DCI, the MAC CE indicating a given available-slot list from among the plurality of available-slot lists and the DCI including the slot information associated with determining the available slot from the given available-slot list indicated by the MAC CE.

In an eleventh aspect, alone or in combination with one or more of the first through tenth aspects, process 700 includes the one or more available slots are included in an available-slot list, and the dynamic downlink communication includes a MAC CE and DCI, the MAC CE indicating a subset of the one or more available slots and the DCI including the slot information associated with determining the available slot from the subset of the one or more available slots indicated by the MAC CE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
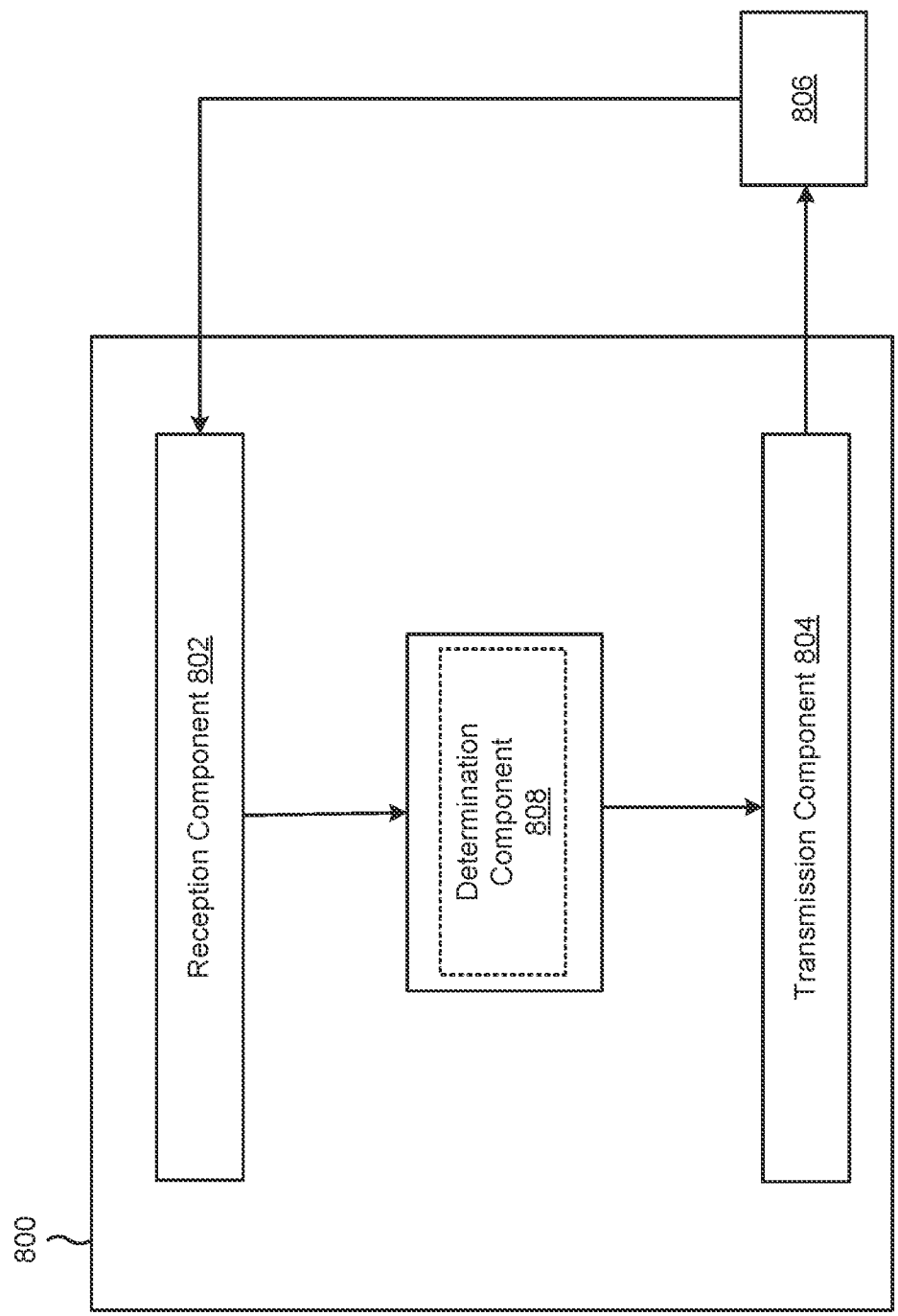
FIG. 8 is a diagram illustrating an example apparatus associated with dynamic determination of available slots for transmission of SRS information, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, from a base station, configuration information regarding one or more available slots associated with transmitting SRS information. The reception component 802 may receive, from the base station, dynamic downlink communication including slot information for determining a select available slot from among the one or more available slots. The transmission component 804 may transmit, to the base station, the SRS information during the select available slot, determined based at least in part on the slot information and the configuration information.

The determination component 808 may determine the select available slot based at least in part on a slot factor, associated with a format related to a given slot, and an initial available slot value, the slot factor being received via the dynamic downlink communication and the initial available slot value being received via the configuration information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a user equipment (UE), comprising: receiving, from a base station, configuration information regarding one or more available slots associated with transmitting sounding reference signal (SRS) information; receiving, from the base station, dynamic downlink communication including slot information for determining a select available slot from among the one or more available slots; and transmitting, to the base station, the SRS information during the select available slot, determined based at least in part on the slot information and the configuration information.

Aspect 2: The method of aspect 1, wherein the one or more available slots are included in an available-slot list.

Aspect 3: The method of any of aspects 1-2, further comprising: determining the select available slot based at least in part on a slot factor, associated with a format related to a given slot, and an initial available slot value, the slot factor being received via the dynamic downlink communication and the initial available slot value being received via the configuration information.

Aspect 4: The method of any of aspects 1-3, wherein the slot information includes a slot factor indicating whether a given slot is an uplink slot reserved for uplink communications from the UE to the base station or is a downlink slot reserved for downlink communications from the base station to the UE.

Aspect 5: The method of any of aspects 1-4, wherein the dynamic downlink communication includes downlink control information (DCI) received during a reference slot, the DCI including the slot information.

Aspect 6: The method of any of aspects 1-5, wherein the select available slot occurs a given quantity of slots after a reference slot, indicated by the configuration information.

Aspect 7: The method of any of aspects 1-6, wherein the dynamic downlink communication includes downlink control information (DCI), and one or more bits included in the DCI indicate the slot information.

Aspect 8: The method of any of aspects 1-7, wherein the dynamic downlink communication includes downlink control information (DCI), and one or more bits included in the DCI indicate the slot information, a quantity of the one or more bits being based at least in part on a quantity of the one or more available slots.

Aspect 9: The method of any of aspects 1-8, wherein the quantity of the one or more bits is based at least in part on a maximum number of available slots associated with a set of available slots of a plurality of sets of available slots.

Aspect 10: The method of any of aspects 1-9, wherein the plurality of sets of available slots are associated with at least one component carrier.

Aspect 11: The method of any of aspects 1-10, wherein the one or more available slots are included in a plurality of available-slot lists, and the dynamic downlink communication includes a medium access control control element (MAC CE) and downlink control information (DCI), the MAC CE indicating a given available-slot list from among the plurality of available-slot lists and the DCI including the slot information associated with determining the available slot from the given available-slot list indicated by the MAC CE.

Aspect 12: The method of any of aspects 1-11, wherein the one or more available slots are included in an available-slot list, and the dynamic downlink communication includes a medium access control control element (MAC CE) and downlink control information (DCI), the MAC CE indicating a subset of the one or more available slots and the DCI including the slot information associated with determining the available slot from the subset of the one or more available slots indicated by the MAC CE.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network node, comprising:
    transmitting, to a user equipment (UE), configuration information regarding a set of available slots associated with transmitting sounding reference signal (SRS) information in an SRS resource set;
    transmitting, to the UE, a dynamic downlink communication including a set of slot information values, the slot information values each indicating a select available slot of the set of available slots; and
    receiving, from the UE, the SRS information during the select available slot, determined based at least in part on the set of slot information values and the configuration information.

2. The method of claim 1, wherein the set of available slots are included in an available-slot list.

3. The method of claim 1, wherein the set of slot information values includes a slot factor indicating whether a given slot is an uplink slot reserved for uplink communications from the UE to the network node or is a downlink slot reserved for downlink communications from the network node to the UE.

4. The method of claim 1, wherein the dynamic downlink communication includes downlink control information (DCI) received during a reference slot, the DCI including the set of slot information values.

5. The method of claim 1, wherein the select available slot occurs a given quantity of slots after a reference slot, indicated by the configuration information.

6. The method of claim 1, wherein the dynamic downlink communication includes downlink control information (DCI), and
    one or more bits included in the DCI indicate the set of slot information values.

7. The method of claim 1, wherein the dynamic downlink communication includes downlink control information (DCI), and
    one or more bits included in the DCI indicate the set of slot information values, a quantity of the one or more bits being based at least in part on a quantity of the set of available slots.

8. The method of claim 7, wherein the quantity of the one or more bits is based at least in part on a maximum number of available slots associated with a set of available slots of a plurality of sets of available slots.

9. The method of claim 8, wherein the plurality of sets of available slots are associated with at least one component carrier.

10. The method of claim 1, wherein the set of available slots are included in a plurality of available-slot lists, and the dynamic downlink communication includes a medium access control control element (MAC CE) and downlink control information (DCI), the MAC CE indicating a given available-slot list from among the plurality of available-slot lists and the DCI including the set of slot information values associated with determining the available slot from the given available-slot list indicated by the MAC CE.

11. The method of claim 1, wherein the set of available slots are included in an available-slot list, and the dynamic downlink communication includes a medium access control control element (MAC CE) and downlink control information (DCI), the MAC CE indicating a subset of the set of available slots and the DCI including the set of slot information values associated with determining the available slot from the subset of the set of available slots indicated by the MAC CE.

12. A network node for wireless communication, comprising:
a memory; and
one or more processors coupled to the memory, the one or more processors configured to:
transmit, to a user equipment (UE), configuration information regarding a set of available slots associated with transmitting sounding reference signal (SRS) information in an SRS resource set;
transmit, to the UE, a dynamic downlink communication including a set of slot information values, the slot information values each indicating a select available slot of the set of available slots; and
receive, from the UE, the SRS information during the select available slot, determined based at least in part on the set of slot information values and the configuration information.

13. The network node of claim 12, wherein the set of available slots are included in an available-slot list.

14. The network node of claim 12, wherein the set of slot information values includes a slot factor indicating whether a given slot is an uplink slot reserved for uplink communications from the UE to the network node or is a downlink slot reserved for downlink communications from the network node to the UE.

15. The network node of claim 12, wherein the dynamic downlink communication includes downlink control information (DCI) received during a reference slot, the DCI including the set of slot information values.

16. The network node of claim 12, wherein the select available slot occurs a given quantity of slots after a reference slot, indicated by the configuration information.

17. The network node of claim 12, wherein the dynamic downlink communication includes downlink control information (DCI), and
one or more bits included in the DCI indicate the set of slot information values.

18. The network node of claim 12, wherein the dynamic downlink communication includes downlink control information (DCI), and
one or more bits included in the DCI indicate the set of slot information values, a quantity of the one or more bits being based at least in part on a quantity of the set of available slots.

19. The network node of claim 18, wherein the quantity of the one or more bits is based at least in part on a maximum number of available slots associated with a set of available slots of a plurality of sets of available slots.

20. The network node of claim 19, wherein the plurality of sets of available slots are associated with at least one component carrier.

21. The network node of claim 12, wherein the set of available slots are included in a plurality of available-slot lists, and
the dynamic downlink communication includes a medium access control control element (MAC CE) and downlink control information (DCI), the MAC CE indicating a given available-slot list from among the plurality of available-slot lists and the DCI including the set of slot information values associated with determining the available slot from the given available-slot list indicated by the MAC CE.

22. The network node of claim 12, wherein the set of available slots are included in an available-slot list, and
the dynamic downlink communication includes a medium access control control element (MAC CE) and downlink control information (DCI), the MAC CE indicating a subset of the set of available slots and the DCI including the set of slot information values associated with determining the available slot from the subset of the set of available slots indicated by the MAC CE.

23. A non-transitory computer-readable medium storing a set of instructions for wireless communication, the set of instructions comprising:
one or more instructions that, when executed by one or more processors of a network node, cause the network node to:
transmit, to a user equipment (UE), configuration information regarding a set of available slots associated with transmitting sounding reference signal (SRS) information in an SRS resource set;
transmit, to the UE, a dynamic downlink communication including a set of slot information values, the slot information values each indicating a select available slot of the set of available slots; and
receive, from the UE, the SRS information during the select available slot, determined based at least in part on the set of slot information values and the configuration information.

24. The non-transitory computer-readable medium of claim 23, wherein the set of available slots are included in an available-slot list.

25. The non-transitory computer-readable medium of claim 23, wherein the set of slot information values includes a slot factor indicating whether a given slot is an uplink slot reserved for uplink communications from the UE to the network node or is a downlink slot reserved for downlink communications from the network node to the UE.

26. The non-transitory computer-readable medium of claim 23, wherein the dynamic downlink communication includes downlink control information (DCI) received during a reference slot, the DCI including the set of slot information values.

27. The non-transitory computer-readable medium of claim 23, wherein the select available slot occurs a given quantity of slots after a reference slot, indicated by the configuration information.

28. The non-transitory computer-readable medium of claim 23, wherein the dynamic downlink communication includes downlink control information (DCI), and
one or more bits included in the DCI indicate the set of slot information values.

29. The non-transitory computer-readable medium of claim 23, wherein the dynamic downlink communication includes downlink control information (DCI), and one or more bits included in the DCI indicate the set of slot information values, a quantity of the one or more bits being based at least in part on a quantity of the set of available slots.

30. An apparatus for wireless communication, comprising:
- means for transmitting, to a user equipment (UE), configuration information regarding a set of available slots associated with transmitting sounding reference signal (SRS) information in an SRS resource set;
- means for transmitting, to the UE, a dynamic downlink communication including slot information values, the slot information values each indicating a select available slot of the set of available slots; and
- means for receiving, from the UE, the SRS information during the select available slot, determined based at least in part on the set of slot information values and the configuration information.

* * * * *